(No Model.)
J. E. MUNRO.
COMBINATION CAN OPENER.
No. 573,991. Patented Dec. 29, 1896.
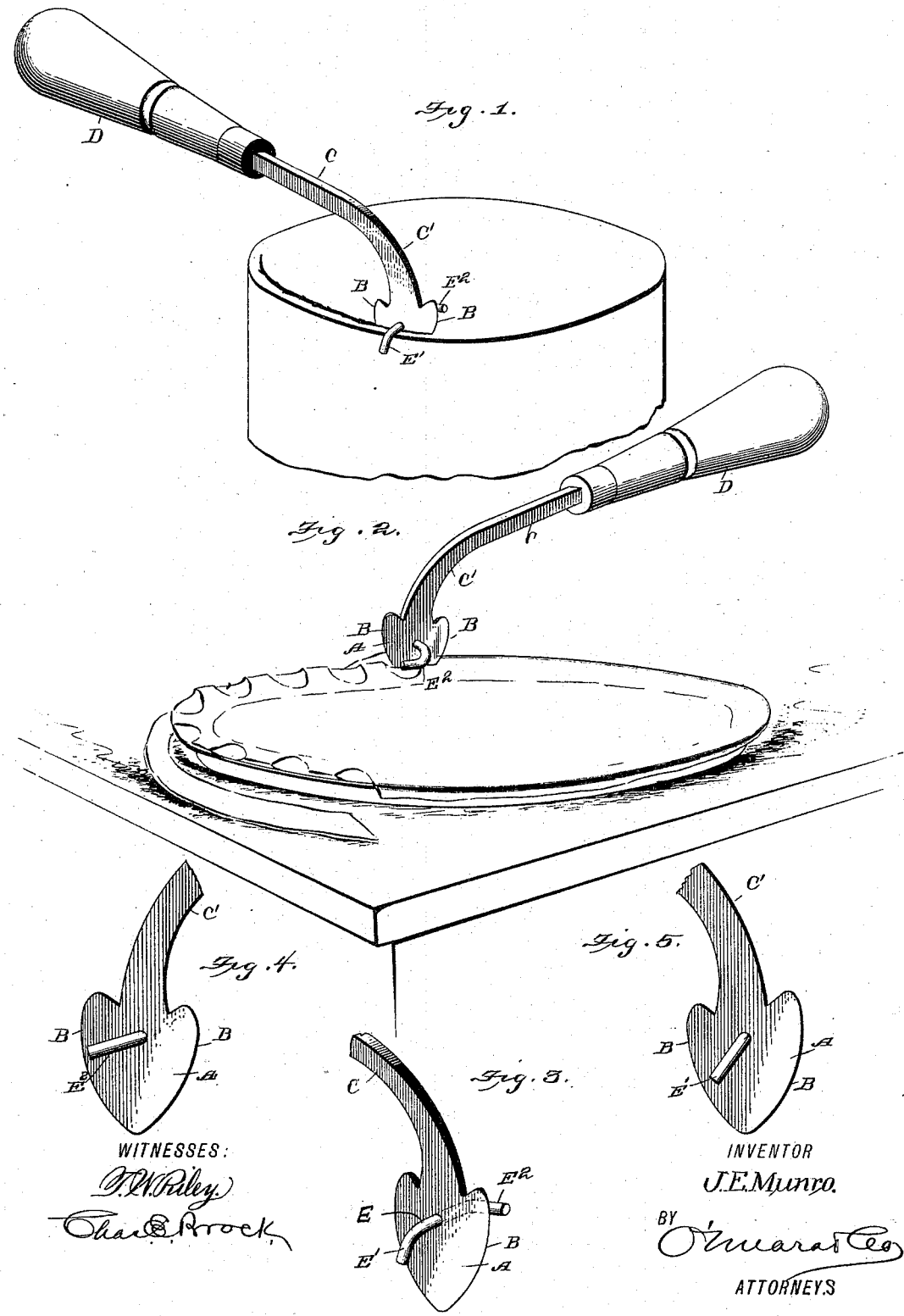

United States Patent Office.

JOHN E. MUNRO, OF CARLISLE, PENNSYLVANIA.

COMBINATION CAN-OPENER.

SPECIFICATION forming part of Letters Patent No. 573,991, dated December 29, 1896.

Application filed June 30, 1896. Serial No. 597,528. (No model.)

*To all whom it may concern:*

Be it known that I, JOHN E. MUNRO, residing at Carlisle, in the county of Cumberland and State of Pennsylvania, have invented a new and Improved Combination Can-Opener, of which the following is a specification.

This invention is an improved combination-tool comprising a can-opener and a pie trimmer and crimper.

The object of my invention is to provide a cheap and simple device which will successfully cut the top from a tin can and will at the same time prevent the device from slipping to one side or the other; and a still further object is to provide an attachment whereby the central or free portion of the top of the can will be prevented from curling, as usually the case with the can-openers now in common use.

Another object of my invention is to provide a can-opener or blade which can also be used for the purpose of trimming the surplus dough on the edge of the pie; and a still further object is to provide this device with means whereby as the dough is trimmed around the edge of the pan such trimmed edge will be crimped, thereby giving the dough the proper pressure and at the same time crimping or scalloping the edge.

With these various objects in view my invention consists, essentially, of a double-edged blade and a rod or pin passed transversely through the center of said blade, the right-hand end of said rod being turned down, while the left-hand end of the rod or pin is turned forwardly.

My invention consists also in certain details of construction and novelties of combination, all of which will be fully described hereinafter and pointed out in the claims.

In the drawings forming a part of this specification, Figure 1 is a view showing my invention used for the purpose of opening the top of a can. Fig. 2 shows my invention used as a pie trimmer and crimper. Fig. 3 is a detail view of the operative portion of the instrument. Fig. 4 is a view thereof from one side. Fig. 5 is a view from the opposite side.

In carrying out my invention I employ a blade A, which is essentially heart or spear shaped, having cutting edges B. Integral with the blade A is a shank C, said shank being curved, as shown at C'. Near the blade and upon the rear end of said shank is securely fitted a suitably-shaped handle D. A small rod or pin E is passed transversely through the center of the blade A and securely fastened therein in any suitable manner.

In practice the blade or head is about one inch in length and the pin is about one and one-half inches in length, three-fourths of an inch being upon each side of the blade. The right-hand portion of the pin or rod is bent downwardly, as shown at E', substantially at right angles, and the left-hand end of said pin or rod is curved forwardly and upwardly, as shown at $E^2$, the forward curve preponderating.

Now in operation when it is desired to open the top of the can the point of the blade is driven through the top near the edge of the can, and the end E' of the pin rests upon the outer edge of the can and so holds the blade in place as the same is moved around to cut the tin of the top. The blade can be moved either toward or from the person cutting, and the left-hand end E' of the pin will serve to prevent the free or central portion of the tin top from curling upward and cutting the hand, as so commonly occurs with the can-openers now in use.

When the device is to be used as a pie trimmer and crimper, the blade is moved either toward or from the person, and the surplus dough is cut away in short cuts, and at each short cut the end $E^2$ of the pin will serve to press the dough down, and in so doing will crimp or scallop the edge, thereby giving the edge of the pie proper ornamentation, as well as securely pressing said edge down upon the bottom crust of the pie.

It will thus be seen that I provide an exceedingly cheap and simple combination-tool, which may be used either as a can-opener, pie-trimmer, or pie-crimper.

It will also be noticed that as a can-opener it is absolutely safe in operation, inasmuch as the downwardly-bent end of the pin prevents the device from slipping to either side, and the inwardly-bent end of said pin prevents the free end of the tin curling upward and cutting the hand.

It will furthermore be noticed that this device can be used for cutting sheet metal in either a straight or curved line.

Having thus described my invention, what I claim as new, and desire to secure by Letters Patent, is—

1. In a tool of the kind described, a double-edged blade having a pin passed transversely therethrough, the ends of said pin being bent in opposite directions, substantially as shown and described.

2. In a tool of the kind described, a double-edged blade essentially heart or spear shaped, having a pin passed transversely therethrough, one end of said pin being bent downwardly and the other end bent forwardly, substantially as shown and described.

3. In a combination-tool of the kind described, a blade or head having the double cutting edges and pointed, as described, and a transverse pin rigidly fixed centrally of said blade, said pin having the right-hand end bent downwardly, and the left-hand end bent forwardly, substantially as shown and described.

4. In a combination-tool of the kind described, the combination with the pointed double-edge blade or head, of the integral shank curved, as described, and carrying the handle at the rear end, and the rigid transverse pin passing centrally through the head or blade, the right-hand end being curved downwardly and the left-hand end curved forwardly, substantially as shown and described.

JOHN E. MUNRO.

Witnesses:
GEO. M. HAYS,
JOHN S. MUNRO.